(12) United States Patent
Qian et al.

(10) Patent No.: US 12,151,838 B2
(45) Date of Patent: Nov. 26, 2024

(54) FILLING METHOD FOR REDUCING WASTAGE OF LIQUID MEDICINE

(71) Applicant: TRUKING TECHNOLOGY LIMITED, Hunan (CN)

(72) Inventors: Zhan Qian, Hunan (CN); Wei Peng, Hunan (CN); Bo Yi, Hunan (CN); Tianqiao Bai, Hunan (CN); Huanghui Long, Hunan (CN)

(73) Assignee: TRUKING TECHNOLOGY LIMITED, Hunan (CN)

( * ) Notice: Subject to any disclaimer, the term of this patent is extended or adjusted under 35 U.S.C. 154(b) by 60 days.

(21) Appl. No.: 18/019,815

(22) PCT Filed: Aug. 26, 2020

(86) PCT No.: PCT/CN2020/111388
§ 371 (c)(1),
(2) Date: Feb. 5, 2023

(87) PCT Pub. No.: WO2022/027746
PCT Pub. Date: Feb. 10, 2022

(65) Prior Publication Data
US 2023/0286682 A1    Sep. 14, 2023

(30) Foreign Application Priority Data
Aug. 5, 2020    (CN) .......................... 202010779601.2

(51) Int. Cl.
*B65B 3/28*    (2006.01)
*B65B 3/00*    (2006.01)
(Continued)

(52) U.S. Cl.
CPC ................ *B65B 3/28* (2013.01); *B65B 3/003* (2013.01); *B65B 3/12* (2013.01); *B67C 3/26* (2013.01)

(58) Field of Classification Search
CPC .. B65B 3/28; B65B 3/003; B65B 3/12; B65B 3/26
See application file for complete search history.

(56) References Cited

U.S. PATENT DOCUMENTS 5,168,905 A * 12/1992 Phallen ..................... B65B 3/36
141/237
2009/0094940 A1* 4/2009 Py ........................... B67C 3/023
53/267

FOREIGN PATENT DOCUMENTS

CN    204981079    1/2016
CN    207631539    7/2018
(Continued)

OTHER PUBLICATIONS

"International Search Report (Form PCT/ISA/210) of PCT/CN2020/111388," mailed on Apr. 25, 2021, with English translation thereof, pp. 1-4.
(Continued)

*Primary Examiner* — Timothy L Maust
(74) *Attorney, Agent, or Firm* — JCIPRNET

(57) ABSTRACT

A filling method capable of reducing medicinal liquid loss, comprising weighing stations and a liquid-dividing container. The liquid-dividing container is provided with liquid outlets; filling needles arranged side by side are correspondingly arranged above the plurality of weighing stations; the respective liquid outlets and the respective filling needles are connected by means of pipelines; and the respective pipelines are each provided with a filling pump. The filling method comprises: upon detecting that the amount of medicinal liquid in the liquid-dividing container is insufficient, conveying medicine bottles to the weighing stations, filling the medicine bottles by the first filling needle, and then performing liquid supplementation filling by the adjacent second filling needle or by the third filling needle until
(Continued)

the filling amount of the medicinal liquid in the medicine bottles is qualified, thus respectively filling the medicine bottles one by one, and emptying the remaining medicinal liquid in the pipelines.

15 Claims, 3 Drawing Sheets

(51) Int. Cl.
*B65B 3/12* (2006.01)
*B67C 3/26* (2006.01)

(56) References Cited

FOREIGN PATENT DOCUMENTS

| | | |
|---|---|---|
| CN | 110467142 | 11/2019 |
| CN | 111483631 | 8/2020 |
| CN | 111846306 | 10/2020 |
| CN | 111846308 | 10/2020 |
| DE | 10209435 | 8/2003 |

OTHER PUBLICATIONS

"Written Opinion of the International Searching Authority (Form PCT/ISA/237) of PCT/CN2020/111388," mailed on Apr. 25, 2021, pp. 1-5.

\* cited by examiner

FILLING METHOD FOR REDUCING WASTAGE OF LIQUID MEDICINE

CROSS-REFERENCE TO RELATED APPLICATION

This application is a 371 of international application of PCT application serial no. PCT/CN2020/111388, filed on Aug. 26, 2020, which claims the priority benefit of China application no. 202010779601.2, filed on Aug. 5, 2020. The entirety of each of the above mentioned patent applications is hereby incorporated by reference herein and made a part of this specification.

TECHNICAL FIELD

The invention relates to the technical field of mechanical equipment for packaging food and medicine, in particular to a filling method for reducing the wastage of liquid medicine.

DESCRIPTION OF RELATED ART

Existing liquid medicine filling devices comprise filling needles, a filling station, a pre-weighing station located in front of the filling station and used for weighing empty bottles, and a post-weighing station located behind the filling station and used for weighing bottles filled with liquid medicine, wherein the filling needles are fixedly disposed above the filling station, so a liquid supplement mechanism has to be disposed on the station behind the filling station to supplement bottles, liquid in which is not up to standard, with liquid, so the manufacturing cost of the liquid medicine filling device is increased; and due to the large number of stations, the working efficiency is low. In addition, the existing liquid supplement mechanism is low in liquid supplement efficiency and cannot meet the requirement for high-efficiency liquid supplement. Moreover, when the existing liquid medicine filling device is used for liquid medicine filling, a large amount of liquid medicine is wasted. Furthermore, the filling quantity of liquid medicine should be strictly controlled, and especially, in the initial state of medicine filling, accurate quantitative filling is hard to realize because air exists in the pipe of the filling device; after filling, medicine bottles are measured, and bottles not up to the standard of filling quantity will be rejected, leading to the waste of medicine. In the last stage of filling of one batch of liquid medicine, if the total quantity of liquid medicine is insufficient, it will be difficult to ensure that the quantity of liquid medicine in each medicine bottle is up to standard when multiple medicine bottles are filled at the same time, and medicine bottles not up to the standard of filling quantity have to be rejected, leading to the waste of medicine again.

In the production preparation stage of a filling system, emptying and remaining liquid filling are generally performed with manual intervention, so the efficiency is low, the contamination risk is high, and too much liquid medicine is left. According to different filling quantities and different numbers of filling heads, 500 ml-2000 ml of liquid medicine is left generally. If the remaining liquid medicine can be fully used, about 500-1000 bottles of liquid medicine up to standard can be additionally produced in each batch if the filling quantity of the bottles is 2 ml; according to the market value 100 yuan/bottle, each batch can additionally create 50,000-100,000 yuan, and if 100 batches of products are produced per year, 5,000,000-10,000,000 yuan can be additionally created per year. So, for high value-added biological medicine and new medicine, a great economic benefit will be brought.

SUMMARY OF THE INVENTION

Technical Problem

The technical issue to be settled by the invention is to overcome the defects of the prior art by providing a filling method for reducing the wastage of liquid medicine.

The Solution to the Problem

Technical Solution

In order to solve the above problems, the present invention adopts the following technical solutions:

A filling method for reducing the wastage of liquid medicine, using multiple weighing stations and a liquid distribution container, the liquid distribution container being provided with multiple liquid outlets, multiple filling needles which are arranged side by side being correspondingly disposed above the multiple weighing stations, the liquid outlets being connected to the filling needles through pipes respectively, and filling pumps being disposed on the pipes, wherein during filling of remaining liquid medicine in the pipes, the filling method comprises: conveying medicine bottles onto the weighing stations, filling one of the medicine bottles by a first filling needle, complementing the medicine bottle with liquid medicine by an adjacent second filling needle or complementing the medicine bottle with liquid medicine by a third filling needle until the filling quantity of liquid medicine in the medicine bottle is up to standard, and filling other medicine bottles one-by-one in this way to empty the remaining liquid medicine in the pipes.

As further improvement of the above technical solution:

The first filling needle is one of the filling needles, the second filling needle is an adjacent filling needle which has finished filling, and the third filling needle is a non-adjacent filling needle which has finished filling.

The filling method further comprises: quantitatively filling the medicine bottles on the weighing stations, and performing liquid complementing while weighing to make the quantity of liquid medicine in the medicine bottles up to standard.

The filling method further comprises: weighing on the weighing stations, performing synchronous filling, and complementing medicine bottles, the filling quantity of liquid medicine in which is not up to standard, with liquid medicine by one said filling needle in a low position.

The medicine bottles, the filling quantity of liquid medicine in which is not up to standard, with liquid medicine by the lowest filling needle.

The liquid distribution container is arranged obliquely, and in every two adjacent said filling needles, the rear filling needle is connected to an upper one of two adjacent said liquid outlets of the liquid distribution container, and the front filling needle is connected to a lower one of the two adjacent liquid outlets of the liquid distribution container.

An inclination angle of the liquid distribution container is a, and $0° < a \leq 10°$.

A liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

A liquid inlet is formed in a top of the liquid distribution container, and the buffer tank is connected to the liquid inlet of the liquid distribution container through the connecting pipe.

Beneficial Effects of the Invention

Beneficial Effect

Compared with the prior art, the invention has the following advantages:

The filling method for reducing the wastage of liquid medicine uses a liquid medicine filling device which comprises multiple weighing stations and a liquid distribution container, the liquid distribution container is provided with multiple liquid outlets, multiple filling needles which are arranged side by side are correspondingly disposed above the multiple weighing stations, the liquid outlets are connected to the filling needles through pipes respectively, and filling pumps are disposed on the pipes; and the filling method comprises: when it is detected that the quantity of liquid medicine in the liquid distribution container is insufficient, conveying medicine bottles onto the weighing stations, filling one of the medicine bottles by a first filling needle, complementing the medicine bottle with liquid medicine by an adjacent second filling needle or complementing the medicine bottle with liquid medicine by a third filling needle until the filling quantity of liquid medicine in the medicine bottle is up to standard, and filling other medicine bottles one-by-one in this way to empty remaining liquid medicine in the pipes. The filling method can fill medicine bottles one-by-one to empty remaining liquid medicine in the pipes, thus reducing the wastage of liquid medicine.

BRIEF DESCRIPTION OF THE DRAWINGS

Description of the Drawings

Figure 1:
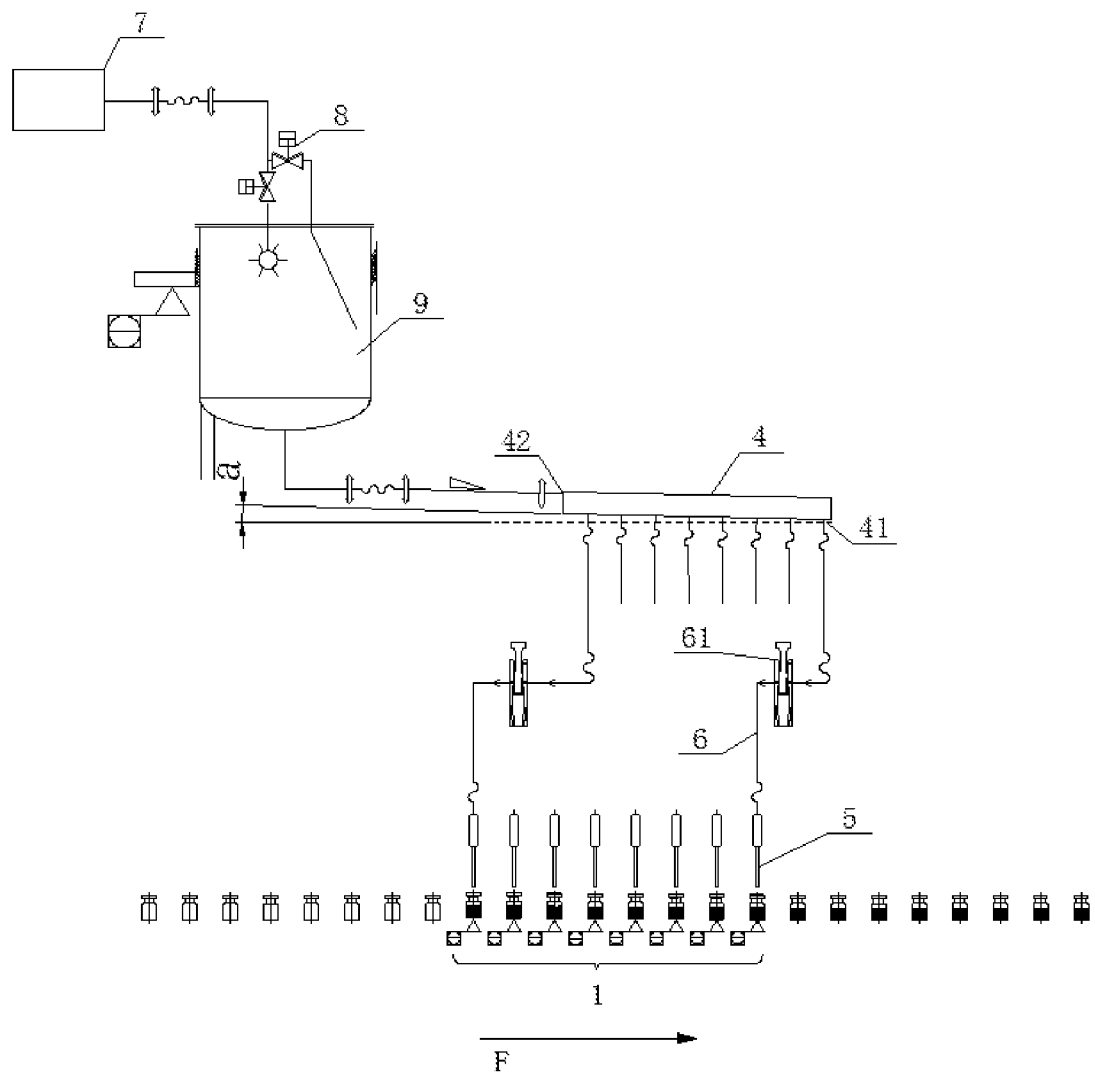

FIG. 1 is a structural diagram of a liquid medicine filling device according to the invention.

Figure 2:
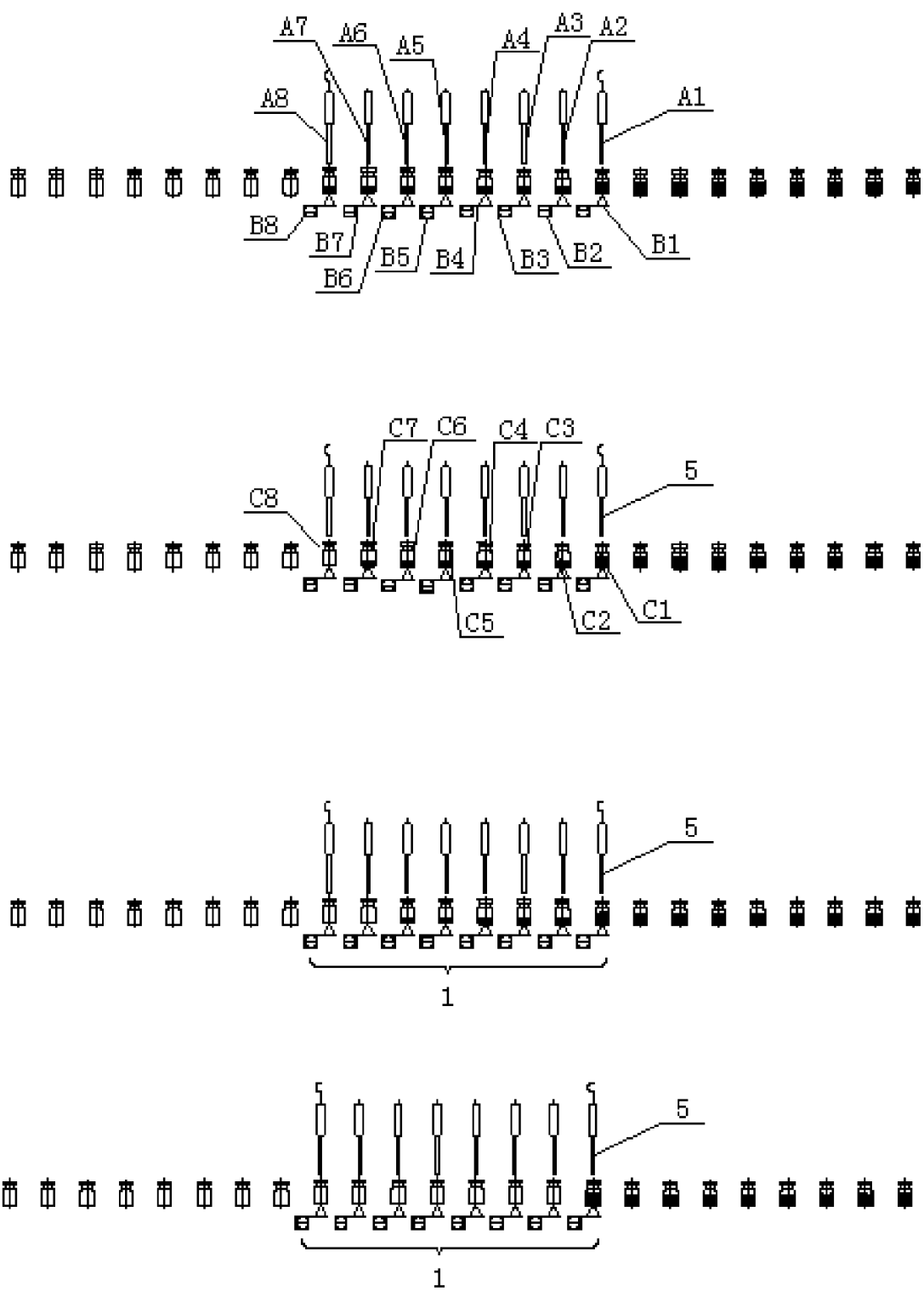

FIG. 2 illustrates a comparison diagram of a liquid medicine filling method during remaining liquid filling according to the invention.

Figure 3:
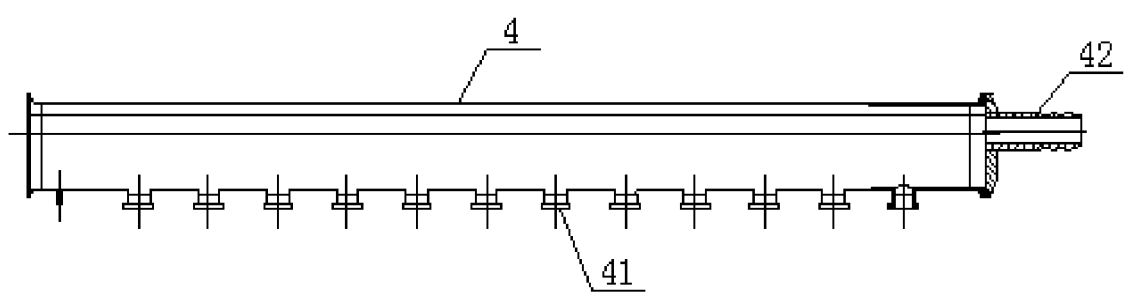

FIG. 3 is a structural diagram of a liquid distribution container of the liquid medicine filling device according to the invention.

REFERENCE SIGNS 1, weighing station; 4, liquid distribution container; 41, liquid outlet; 42, liquid inlet; 5, filling needle; 6, pipe; 61, filling pump; 7, medicine supply device; 8, liquid inlet valve; 9, buffer tank.

EMBODIMENTS OF THE INVENTION

Embodiments of the Present Invention

The invention will be described in further detail below in conjunction with accompanying drawings and specific embodiments.

FIG. 1 to FIG. 3 illustrate one embodiment of a filling method for reducing the wastage of liquid medicine according to the invention. The filling method uses a liquid medicine filling device, which comprises multiple weighing stations 1 and a liquid distribution container 4, wherein the liquid distribution container 4 is provided with multiple liquid outlets 41, multiple filling needles 5 which are arranged side by side are correspondingly disposed above the multiple weighing stations 1, the liquid outlets 41 are connected to the filling needles 5 through pipes 6 respectively, and filling pumps 61 are disposed on the pipes 6. The filling method comprises filling of remaining liquid in the pipes 6, which specifically comprises: conveying medicine bottles onto the weighing stations 1, filling each medicine bottle by a first filling needle 5, supplementing the medicine bottle with liquid medicine by an adjacent second filling needle 5 or a third filling needle until the filling quantity of liquid medicine in the medicine bottle is up to standard, and filling other medicine bottles one-by-one in each way to empty the remaining liquid medicine in the pipes 6. Through the filling method, medicine bottles can be filled one-by-one to empty the remaining liquid medicine in the pipes 6, so the wastage of liquid medicine is reduced.

In this embodiment, the first filling needle 5 is one of the filling needles 5, the second filling needle 5 is an adjacent filling needle 5 which has finished filling, and the third filling needle is a non-adjacent filling needle 5 which has finished filling. Specifically, after being filled by one first filling needle 5, the medicine bottle is supplemented with liquid medicine by the adjacent filling needle 5 which has finished filling; or after being filled by one first filling needle 5, the medicine bottle is supplemented with liquid medicine by the non-adjacent filling needle 5 which has finished filling; if the quantity of liquid medicine in the medicine bottle is still not up to standard, the medicine bottle will be supplemented with liquid medicine by other filling needles 5 that have not been filled with liquid medicine until the filling quantity of liquid medicine in the medicine bottle is up to standard, and the medicine bottles are filled one-by-one to empty the remaining liquid medicine in the pipes 6.

In this embodiment, the filling method further comprises: quantitatively filling the medicine bottles on the weighing stations 1, and performing liquid supplementing while weighing to make the quantity of liquid medicine in each medicine bottle up to standard. For example, remaining liquid filling is performed on the weighing stations 1, and the filling needles 5 can be used for both quantitative filling and complementary filling, such that the liquid supplementing efficiency is improved. For another example, normal filling is performed on the weighing stations 1, and both filling and supplementary filling are performed on the weighing stations 1, such that the production efficiency is improved.

In this embodiment, the filling method further comprises: weighing on the weighing stations 1, performing synchronous filling, and supplementing medicine bottles, the filling quantity of liquid medicine in which is not up to standard, with liquid medicine by one filling needle 5 in a lower position. The synchronous filling means that all the filling needles 5 perform filling at the same time, and weighing is performed while filling. For example, during filling of the remaining liquid medicine in the liquid distribution container 4, the filling needles 5 perform synchronous filling first, and then medicine bottles not up to standard are supplemented with liquid medicine with the lower filling needle 5, such that the remaining liquid filling efficiency is improved, and the waste of liquid medicine is reduced.

In this embodiment, the medicine bottles not up to standard are supplemented with liquid medicine by the lowest filling needle 5. Specifically, on the weighing stations 1, only the lowest filling needle 5 is used for liquid supplementing and the other filling needles 5 are used for normal filling until no liquid medicine flows out. The medicine bottles not up to standard are supplemented with liquid medicine by the lowest filling needle 5, such that movements of the medicine bottles are reduced, making the operation easier and improving the working efficiency.

In this embodiment, the liquid distribution container 4 is arranged obliquely, and in every two adjacent filling needles 5, the rear filling needle 5 is connected to an upper one of two adjacent liquid outlets 41 of the liquid distribution container 4, and the front filling needle 5 is connected to a lower one of the two adjacent liquid outlets 41 of the liquid distribution container 4. The inclination angle of the liquid distribution container 4 is a, $0° < a \leq 10°$. The liquid medicine filling device further comprises a medicine supply device 7, a liquid inlet valve 8 and a buffer tank 9, wherein the medicine supply device 7 is connected to the buffer tank 9 through a liquid inlet pipe, the liquid inlet valve 8 is disposed on the liquid inlet pipe, and the buffer tank 9 is connected to the liquid distribution container 4 through a connecting pipe. A liquid inlet 42 is formed in the top of the liquid distribution container 4, and the buffer tank 9 is connected to the liquid inlet 42 of the liquid distribution container 4 through the connecting pipe.

The specific filling steps of the liquid medicine filling device are as follows;

Step 1: filling and emptying (for example, the number of the filling needles 5 is 8 and the number of balances on the weighing stations 1 is 8, the filling needles 5 are marked as A1-A8 from front to back in a medicine bottle conveying device F, the balances are marked as B1-B8 from front to back, and the filling needles 5 are aligned with the balances on the weighing stations 1)
 (a) Intermittently feeding liquid into the liquid distribution container 4 by the buffer tank 9 to realize bubble-free filling of liquid in the liquid distribution container 4;
 (b) Moving medicine bottles forward, eight each time; continuously conveying three groups of medicine bottles onto the weighing stations 1 (according to a sectorial cycle);
 (c) When the medicine bottles move above the balances, inserting the filling needles 5 into the medicine bottles;
 (d) Filling and weighing the medicine bottles at the same time to empty all the pipes;
 (e) After the pipes are emptied, continuing to move the medicine bottles to complete the filling of the other two groups of medicine bottles;
 (f) After emptying is finished, performing filling quantity calibration (performing filling quantity calibration in presence of quantitative filling; otherwise, repeating filling and weighing, and not performing filling quantity calibration);

Step 2: filling quantity calibration
 (a) Continuously feeding bottles, eight each time;
 (b) When a group of medicine bottles (eight) move above the balances, inserting the filling needles 5 into the medicine bottles (the eight medicine bottles in the group are marked as C1-C8 from front to back);
 (c) Obtaining weights of the eight empty medicine bottles by the eight balances respectively, and filling the medicine bottles according to a target filling quantity;
 (d) Obtaining gross weights of the medicine bottles filled with liquid medicine, and calculating the net weight of liquid medicine to be filled by each filling pump 61;
 (e) Caching the net weight of the liquid medicine filled by the filling pumps 61 each time to determine whether to perform filling quantity calibration;
 (f) Determining whether the filling quantity of liquid medicine in each medicine bottle is up to standard; if so, filling the next group of medicine bottles; otherwise, performing Step c, wherein the target filling quantity at this moment is a deviation of the medicine bottle obtained in the previous round of filling;
 (g) Successively determining single-pass net weights of two groups of medicine bottles, comparing internal deviations, and if the internal deviations are within a certain range (for example, the internal deviations are within 1%), calculating an average value for calibration; and
 (h) Continuing the filling until single-pass filling of each filling needle 5 is up to standard, and performing normal filling.

Step 3: remaining liquid filling (the first method)
 (a) When it is detected, by a weighing sensor of the buffer tank 9, that the level of liquid medicine in the buffer tank 9 is low, performing remaining liquid filling;
 (b) Feeding bottles continuously, one each time, until the medicine bottle reaches the balance B8 on the weighing station 1;
 (c) Obtaining the tare weight of the medicine bottle, filling the medicine bottle according to a target filling quantity, and obtaining the gross weight of the medicine bottle after filling;
 (d) Calculating a deviation, and determining whether the filling quantity is up to standard;
 (e) If so, finishing filling of the medicine bottle, moving the medicine bottle away, and filling the next medicine bottle; otherwise, performing Step c to continue the filling, wherein the target filling quantity at this moment is the deviation calculated in the previous round of filling;
 (f) Continuing the filling until the filling quantity of liquid medicine in the medicine bottle is up to standard; if the filling quantity is still not up to standard after n times of filling (n can be set as 3, 4, 5, . . . ), ending the filling performed by the filling needle 5 A8, and moving the medicine bottle forward;
 (g) Performing liquid complementing by the filling needle 5 A7 unit the filling quantity is up to standard;
 (h) Continuing to move the medicine bottle, and performing filling by the filling needle A7; and
 (i) Repeating c-h until filling by the filling needle 5 A1 is completed.

Or Step 3: remaining liquid filling (the second method)
 (a) When it is detected, by a weighing sensor of the buffer tank 9, that the level of liquid medicine in the buffer tank 9 is low, performing remaining liquid filling;
 (b) Feeding bottles continuously, one each time, until the medicine bottles reach the balances B2-B8 on the weighing station 1;
 (c) Obtaining tar weights of the medicine bottles on the balances B2-B8, then filling the medicine bottles, and moving the medicine bottles one-by-one;
 (d) Obtaining deviations of the medicine bottles on the balance B1, and supplementing the medicine bottles with liquid medicine one-by-one;
 (e) After one group of medicine bottles are filled, obtaining tar weights of the next group of medicine bottles on the balances B2-B8, filling the group of medicine bottles, and moving the medicine bottles one-by-one;

(f) If the filling quantity of one filling pump 61 is less than 20%, stopping filling the medicine bottle corresponding to this filling pump 61, and directly rejecting the medicine bottle; and (g) Finally, only feeding the medicine bottle 2; if the filling quantity is still not up to the target filling quantity after the filling pump 61 connected to the filling needle 5 A1 over 30 s, ending the whole process, and stopping production.

During filling preparation, air in pipes is exhausted, and at this moment, the filling quantity of liquid medicine in medicine bottles is not up to standard under the influence of air left in the pipes, so liquid medicine is supplemented while the medicine bottles are weighed, to make the filling quantity of liquid medicine in the medicine bottles up to standard, thus avoiding waste of medicine. When the quantity of medicine in the liquid distribution container 4 is insufficient, quantitative filling is performed by filling needles 5 at high positions first, and filling needles 5 at low positions are used for complementary filling one-by-one, such that remaining liquid (remaining liquid medicine) is effectively used, ensuring that the filling quantity of liquid medicine in only one medicine bottle is not up to standard.

Although the preferred embodiments of the invention have been disclosed above, these embodiments are not used to limit the invention. Any skilled in the art can make many possible transformations, modifications or amendments to the technical solution of the invention based on the technical contents disclosed above without departing from the scope of the technical solution of the invention, so as to obtain equivalent embodiments. Thus, any simple amendments, equivalent changes and modifications made to the above embodiments according to the technical essence of the invention without departing from the contents of the technical solution of the invention should fall within the protection scope of the technical solution of the invention.

What is claimed is:

1. A filling method for reducing the wastage of liquid medicine, comprising multiple weighing stations and a liquid distribution container, the liquid distribution container being provided with multiple liquid outlets, multiple filling needles which are arranged side by side being correspondingly disposed above the multiple weighing stations, the liquid outlets being connected to the filling needles through pipes respectively, and filling pumps being disposed on the pipes, wherein during filling of remaining liquid medicine in the pipes, the filling method comprises: conveying medicine bottles onto the weighing stations, filling one of the medicine bottles by a first filling needle, complementing the medicine bottle with liquid medicine by an adjacent second filling needle or complementing the medicine bottle with liquid medicine by a third filling needle until the filling quantity of liquid medicine in the medicine bottle is up to standard, and filling other medicine bottles one-by-one in this way to empty the remaining liquid medicine in the pipes, each of the filling needles being used for both quantitative filling and complementary filling.

2. The filling method for reducing the wastage of liquid medicine according to claim 1, wherein the first filling needle is one of the filling needles, the second filling needle is an adjacent filling needle which has finished filling, and the third filling needle is a non-adjacent filling needle which has finished filling.

3. The filling method for reducing the wastage of liquid medicine according to claim 1, wherein the filling method further comprises: quantitatively filling the medicine bottles on the weighing stations, and performing liquid complementing while weighing to make the quantity of liquid medicine in the medicine bottles up to standard.

4. The filling method for reducing the wastage of liquid medicine according to claim 1, wherein the filling method further comprises: weighing on the weighing stations, performing synchronous filling, and complementing medicine bottles, the filling quantity of liquid medicine in which is not up to standard, with liquid medicine by one said filling needle in a low position.

5. The filling method for reducing the wastage of liquid medicine according to claim 4, wherein the medicine bottles, the filling quantity of liquid medicine in which is not up to standard, with liquid medicine by the lowest filling needle.

6. The filling method for reducing the wastage of liquid medicine according to claim 1, wherein the liquid distribution container is arranged obliquely, and in every two adjacent said filling needles, a rear filling needle is connected to an upper one of two adjacent said liquid outlets of the liquid distribution container, and a front filling needle is connected to a lower one of the two adjacent liquid outlets of the liquid distribution container.

7. The filling method for reducing the wastage of liquid medicine according to claim 6, wherein an inclination angle of the liquid distribution container is a, and $0°<a\leq10°$.

8. The filling method for reducing the wastage of liquid medicine according to claim 1, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

9. The filling method for reducing the wastage of liquid medicine according to claim 8, wherein a liquid inlet is formed in a top of the liquid distribution container, and the buffer tank is connected to the liquid inlet of the liquid distribution container through the connecting pipe.

10. The filling method for reducing the wastage of liquid medicine according to claim 2, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

11. The filling method for reducing the wastage of liquid medicine according to claim 3, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

12. The filling method for reducing the wastage of liquid medicine according to claim 4, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

13. The filling method for reducing the wastage of liquid medicine according to claim 5, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

14. The filling method for reducing the wastage of liquid medicine according to claim 6, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

15. The filling method for reducing the wastage of liquid medicine according to claim 7, wherein a liquid medicine filling device further comprises a medicine supply device, a liquid inlet valve and a buffer tank, the medicine supply device is connected to the buffer tank through a liquid inlet pipe, the liquid inlet valve is disposed on the liquid inlet pipe, and the buffer tank is connected to the liquid distribution container through a connecting pipe.

* * * * *